US010082940B2

(12) United States Patent
Ivers et al.

(10) Patent No.: US 10,082,940 B2
(45) Date of Patent: *Sep. 25, 2018

(54) TEXT FUNCTIONS IN AUGMENTED REALITY

(71) Applicant: Intel Corporation, Santa Clara, CA (US)

(72) Inventors: Emily N. Ivers, Hillsboro, OR (US); Kahyun Kim, Portland, OR (US); Paul F. Sorenson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,015

(22) Filed: Jul. 3, 2017

(65) Prior Publication Data
US 2018/0114366 A1 Apr. 26, 2018

Related U.S. Application Data

(63) Continuation of application No. 14/757,643, filed on Dec. 23, 2015, now Pat. No. 9,697,648.

(51) Int. Cl.
*G06F 3/0484* (2013.01)
*G06F 3/01* (2006.01)
(Continued)

(52) U.S. Cl.
CPC ....... *G06F 3/04842* (2013.01); *G02B 27/017* (2013.01); *G06F 3/017* (2013.01);
(Continued)

(58) Field of Classification Search
None
See application file for complete search history.

(56) References Cited

U.S. PATENT DOCUMENTS 9,697,648 B1 * 7/2017 Ivers .................... G06T 19/006
2012/0194551 A1 8/2012 Osterhout et al.
(Continued)

FOREIGN PATENT DOCUMENTS

WO WO-2013012603 A2 1/2013
WO WO-2017112099 A1 6/2017

OTHER PUBLICATIONS

"U.S. Appl. No. 14/757,643, Non Final Office Action dated Sep. 8, 2016", 8 pgs.
(Continued)

*Primary Examiner* — Kenneth B Lee, Jr.
(74) *Attorney, Agent, or Firm* — Schwegman Lundberg & Woessner, P.A.

(57) ABSTRACT

Various systems and methods for implementing text functions in augmented reality are described herein. A system for implementing text functions in augmented reality includes a display to display a field of view to a user of the system; a gesture detection module to detect a selection gesture performed by a user of the system, the selection gesture defining a selection area in the field of view; a camera array to capture an image of the selection area; a text module to perform a text operation on text identified in the image; and a presentation module to present an indication of the text operation to the user.

20 Claims, 10 Drawing Sheets

(51) Int. Cl.
*G06T 11/00* (2006.01)
*G02B 27/01* (2006.01)
*G02B 27/00* (2006.01)

(52) U.S. Cl.
CPC .......... *G06T 11/00* (2013.01); *G02B 27/0093* (2013.01); *G02B 2027/0138* (2013.01); *G02B 2027/0178* (2013.01)

(56) References Cited

U.S. PATENT DOCUMENTS

| | | |
|---|---|---|
| 2013/0293577 A1 | 11/2013 | Perez et al. |
| 2014/0063055 A1 | 3/2014 | Osterhout et al. |
| 2014/0139551 A1 | 5/2014 | Mcculloch et al. |
| 2014/0198034 A1 | 7/2014 | Bailey et al. |
| 2014/0361988 A1 | 12/2014 | Katz et al. |
| 2015/0120279 A1 | 4/2015 | Cohen |
| 2017/0186230 A1 | 6/2017 | Ivers et al. |

OTHER PUBLICATIONS

"U.S. Appl. No. 14/757,643, Notice of Allowance dated Mar. 2, 2017", 6 pgs.
"U.S. Appl. No. 14/757,643, Response filed Dec. 8, 2016 to Non Final Office Action dated Sep. 8, 2016", 9 pgs.
"International Application Serial No. PCT/US2016/060138, International Search Report dated Feb. 28, 2017", 3 pgs.
"International Application Serial No. PCT/US2016/060138, Written Opinion dated Feb. 28, 2017", 8 pgs.
Toyama, Takumi, et al., "A Mixed Reality Head-Mounted Text Translation System Using Eye Gaze Input", :Proceedings of the 19th international conference on Intelligent User Interfaces, (2014), 329-334.

\* cited by examiner

TEXT FUNCTIONS IN AUGMENTED REALITY

PRIORITY APPLICATION

This application is a continuation of U.S. application Ser. No. 14/757,643, filed Dec. 23, 2015, now issued as U.S. Pat. No. 9,697,648, which is incorporated herein by reference in its entirety.

TECHNICAL FIELD

Embodiments described herein generally relate to user interfaces and in particular, to text selection functions for various types of processing and display in augmented reality.

BACKGROUND

Augmented reality (AR) viewing may be defined as a live view of a real-world environment whose elements are supplemented (e.g., augmented) by computer-generated sensory input such as sound, video, graphics, or GPS data. For example, software applications executed by smartphones may use the smartphone's imaging sensor to capture a real-time event being experienced by a user while overlaying text or graphics on the smartphone display that supplement the real-time event.

A head-mounted display (HMD), also sometimes referred to as a helmet-mounted display, is a device worn on the head or as part of a helmet that is able to project images in front of one or both eyes. An HMD may be used for various applications including augmented reality or virtual reality simulations. HMDs are used in a variety of fields such as military, gaming, sporting, engineering, and training.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein implement text functions in augmented reality. Example functions include a look-up (definition), translation (from one language to another), or other processing that may be appropriate for textual content. While augmented reality (AR) may be used with handheld devices, head-mounted displays (HMD), or other computing platforms, many of the embodiments described herein refer to AR in HMDs. HMDs come in a variety of form factors including goggles, visors, glasses, helmets with face shields, and the like. As technology improves, HMDs are becoming more affordable for consumer devices and smaller and lighter to accommodate various applications.

Figure 1:
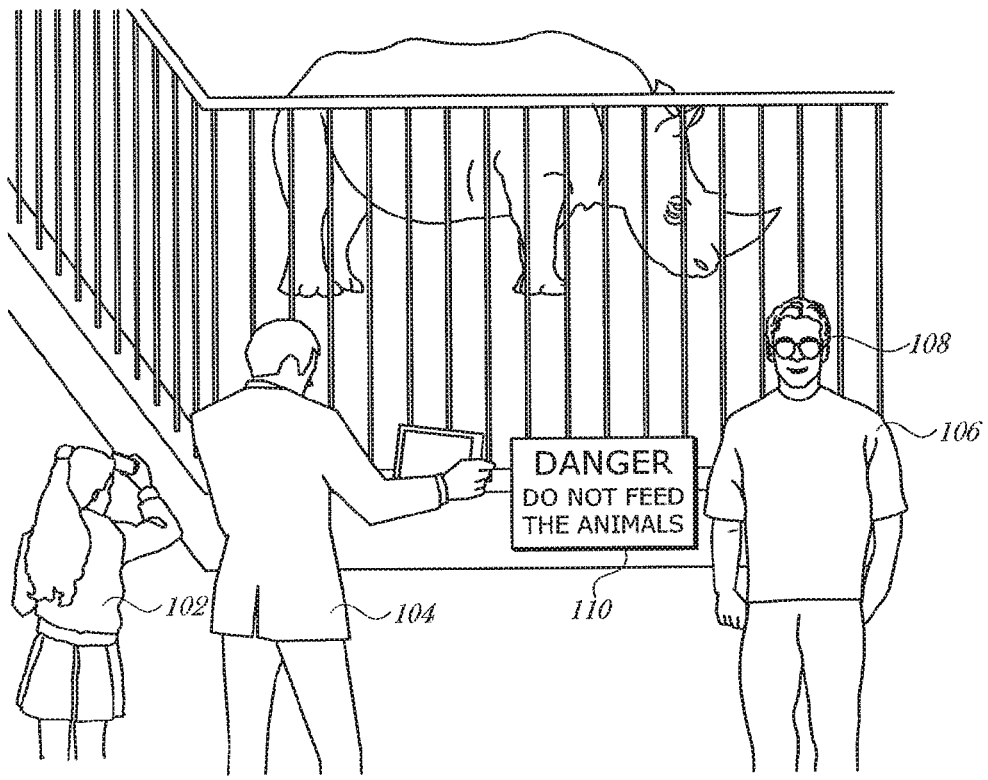
FIG. 1 is a diagram illustrating an environment where users are interacting with the environment through AR, according to an embodiment.

FIG. 1 is a diagram illustrating an environment 100 where users are interacting with the environment 100 through AR, according to an embodiment. The environment 100 includes an event (e.g., an animal displayed in a cage) that is being viewed by a plurality of users 102, 104, and 106. One or more of the users 102-106 may have an AR subsystem. The users 102-106 may use different types of AR subsystems. For example, one of the users 106 is shown with a wearable electronic device 108 (e.g., AR eyeglasses, goggles, etc.) that may include or be the AR subsystem that provides AR content to user 106. Another two of the users 102, 104 are shown with handheld electronic devices (e.g., smartphones, tablets, etc.) that may include or be the AR subsystem that provides AR content to those users 102, 104. The present embodiments are not limited to any one type of AR subsystem.

In FIG. 1, the users 102, 104, 106 are viewing the event. The three users 102, 104, 106 who are viewing the event may be using their AR subsystems 100 to supplement the event with AR content. A sign 110 includes text. The users 102, 104, 106 may initiate a text function on the sign's text, in various embodiments.

Text functions include, but are not limited to translating the text, copying the text (e.g., for use in another application), enlarging the text, looking up definitions, providing additional information about the content, and the like. The text function may be performed and a result of the function rendered in the AR content. Alternatively, the text function may be performed and an indication that the function was performed may be provided to the user.

To initiate a text function in AR, the user performs a specific gesture. Gestures may be user-defined and configured. For example, a "double-pointing" motion may indicate to begin translation services. As another example, a single hand motion with two fingers pointing at the object with text may indicate to begin a copy text function. After copying text, the user may access another application in AR, such as an Internet browser, and paste the text into a user interface text control. Other types of gestures may be used.

Figure 2:
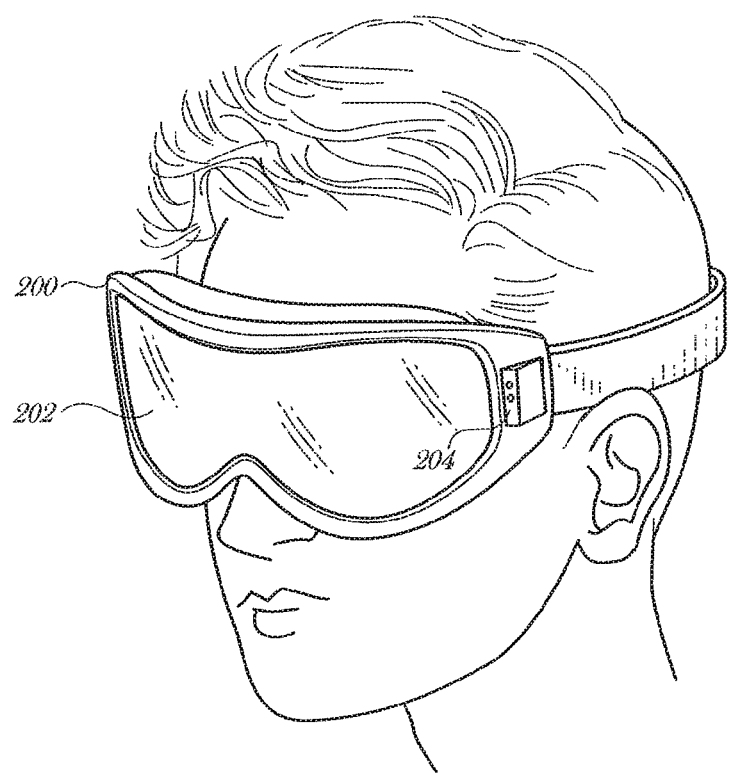
FIG. 2 is a HMD, according to an embodiment.

FIG. 2 is an HMD 200, according to an embodiment. The HMD 200 includes a see-though display surface 202, a camera array 204, and processing circuitry (not shown). An image or multiple images may be projected onto the display surface 202, such as by a microdisplay. Alternatively, some or all of the display surface 202 may be an active display (e.g., an organic light-emitting diode (OLED)) able to produce an image in front of the user. The display also may be provided using retinal projection of various types of light, using a range of mechanisms, including (but not limited to) waveguides, scanning raster, color-separation and other mechanisms.

The camera array 204 may include one or more cameras able to capture visible light, infrared, or the like, and may be used as 2D or 3D cameras (e.g., depth camera). The camera array 204 may be configured to detect a gesture made by the user (wearer) and the processing circuitry may use the gesture to capture images of text identified by the gesture, process the images (e.g., with optical character recognition), and render an image on the display surface 202 for the user.

Figure 3:
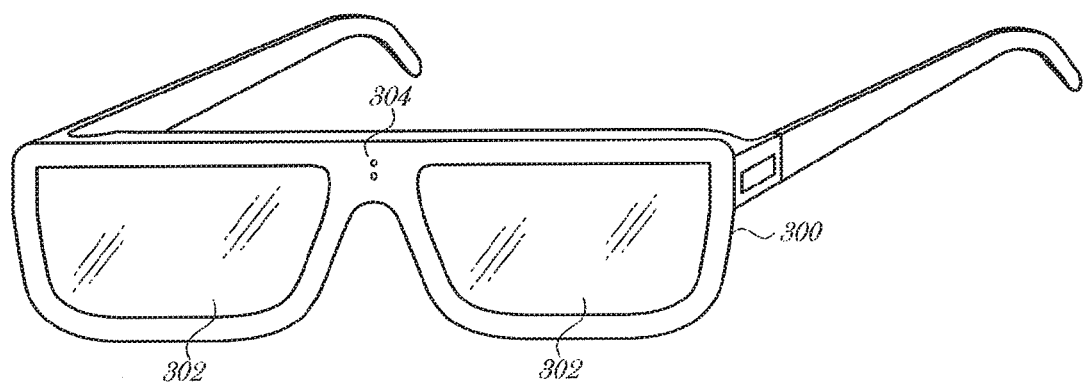
FIG. 3 is another HMD, according to embodiment.

FIG. 3 is another HMD 300, according to embodiment. The HMD 300 in FIG. 3 is in the form of eyeglasses. Similar to the HMD 200 of FIG. 2, HMD 300 includes two display surfaces 302 and a camera array 304. Processing circuitry (not shown) may perform the text functions described above.

Figure 4A:
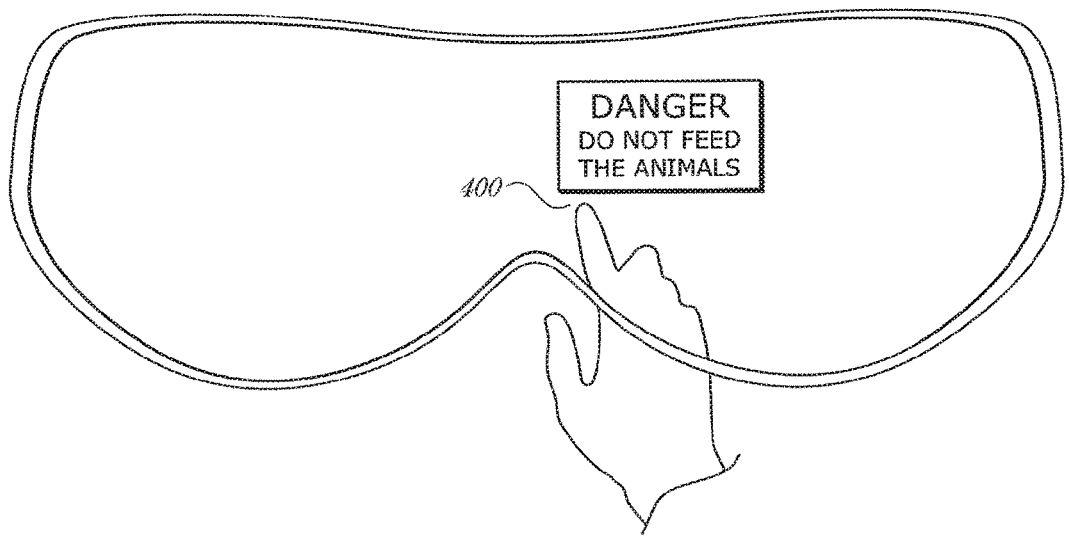
FIGS. 4A and 4B illustrate text translation, according to an embodiment.
Figure 4B:
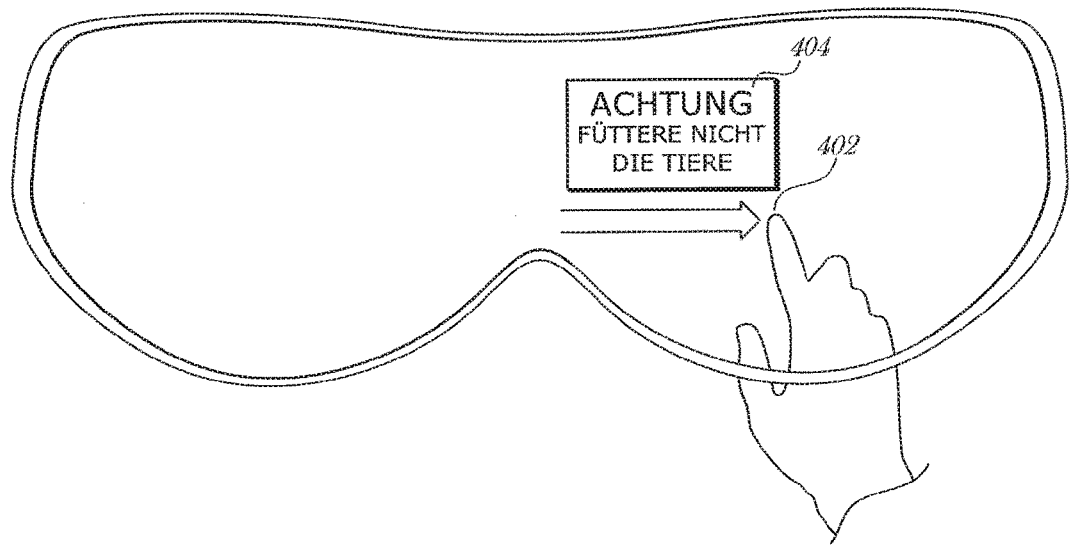

FIGS. 4A and 4B illustrate text translation, according to an embodiment. After a user performs a triggering gesture to enter a particular text function mode of the AR subsystem, the user may then perform one or more text functions on objects in the user's field of view. In the example illustrated in FIG. 4A, the AR subsystem is an HMD and the user is viewing the sign 110 of FIG. 1. The user may be a German tourist visiting a zoo in the United States. After initiating a text translation mode of the AR subsystem, such as with a specific gesture, vocal command, or other input, the user points to the beginning of a text block to translate (point 400) and slides their finger over or near the text to translate, as illustrated in FIG. 4B, ending at point 402. In doing so, the AR subsystem provides a visual overlay on or near the real object (sign 110) of the translated text 404. In a related example, the text on the real-world object is highlighted using a translucent overlay. This is useful to the user to indicate which text is being operated upon. The highlighting may be in a distinctive color, such as yellow, and appear as though a highlighter marker was used to color the real-world object. Alternatively, the highlighting may be a colored block with or without texture, gradient, patterns, or other embellishments, encompassing the textual content. It is understood that other operations may be performed based on the indication or selection gesture performed (e.g., point and slide in this example).

Figure 5A:
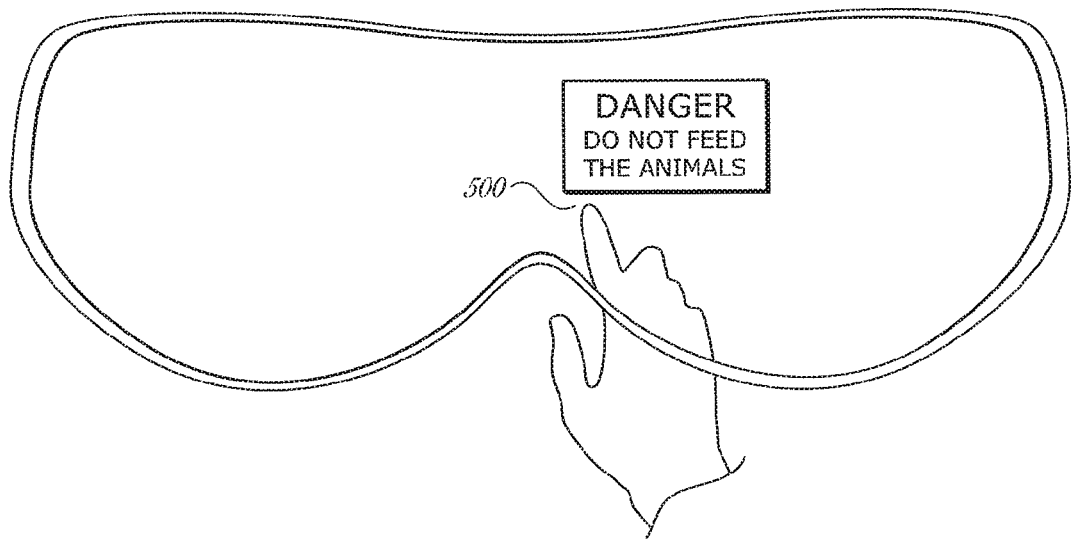
FIGS. 5A and 5B illustrate a selection gesture, according to an embodiment.
Figure 5B:
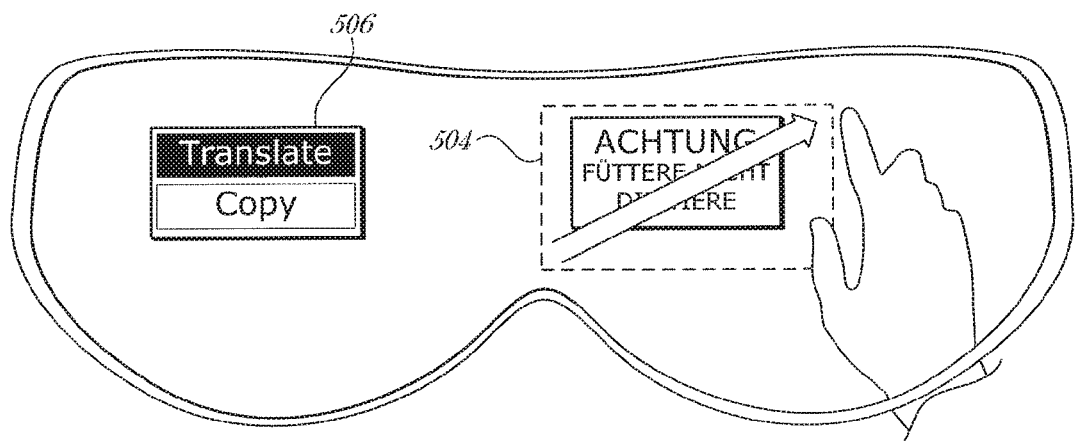

FIGS. 5A and 5B illustrate a selection gesture, according to an embodiment. In this example, the user begins pointing at a first point 500 and then moves their hand to a second point 502, the points 500, 502 are used to create a virtual selection box 504. The contents of the selection box 504 (e.g., sign 110) are then operated upon. In the example illustrated in FIG. 5B, after the user has completed their selection gesture, an option dialog box 506 is displayed in the AR content and the user may select the operation to perform on the selected AR content (e.g., the sign 110). A default operation may be performed as designated by user preferences or system design.

Figure 6A:
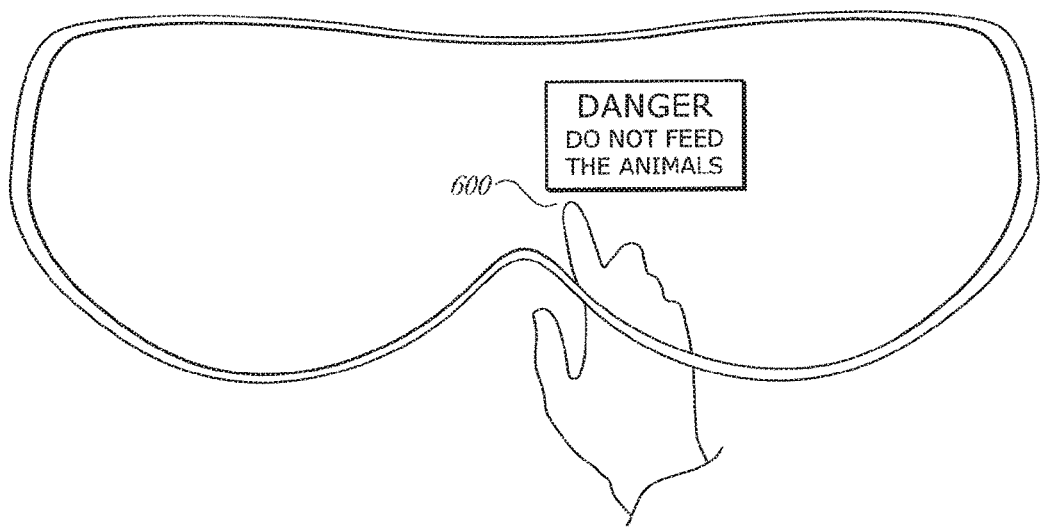
FIGS. 6A and 6B illustrate another selection gesture, according to an embodiment.
Figure 6B:
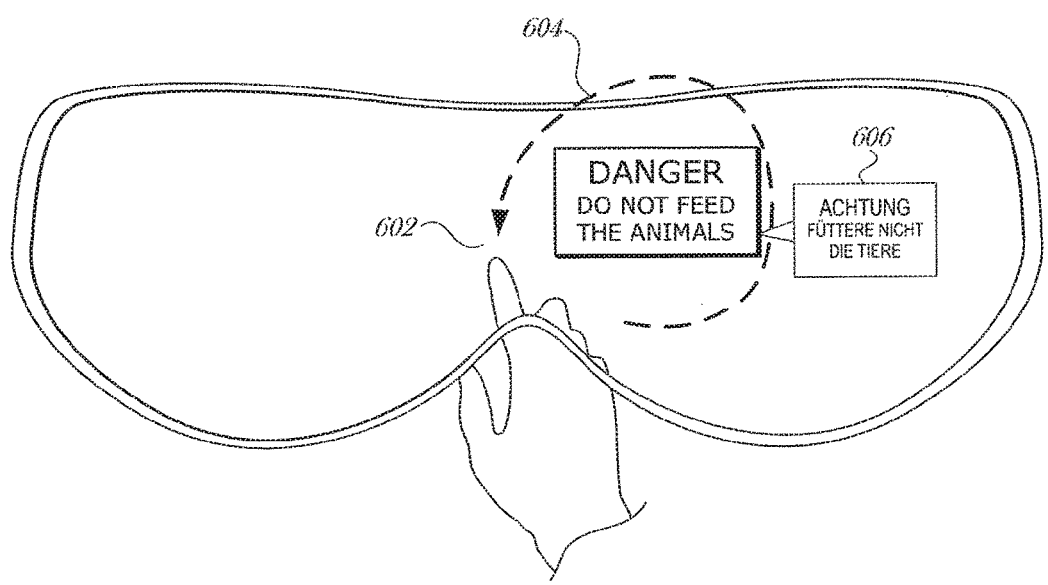

FIGS. 6A and 6B illustrate another selection gesture, according to an embodiment. In this example, the selection gesture begins at a first point 600 and ends at approximately the same position, at the second point 602. The gesture creates a substantially circular or elliptical shape, which defines the selection area 604. The example illustrated in FIG. 6B shows that the AR content 606 (e.g., the translated text) may be displayed adjacent to the real-world object (e.g., the sign 110). A default operation or user-selected operation may then be performed on the selected AR content.

Figure 7:
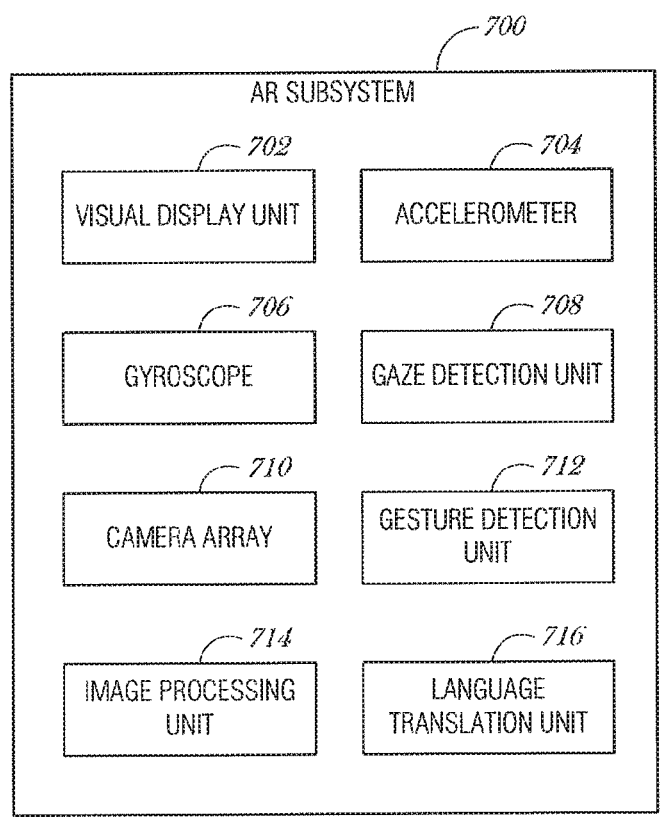
FIG. 7 is a schematic drawing illustrating an AR subsystem in the form of a head-mounted display, according to an embodiment.

FIG. 7 is a schematic drawing illustrating an AR subsystem 700 in the form of a head-mounted display, according to an embodiment. The AR subsystem 700 includes a visual display unit 702, an accelerometer 704, a gyroscope 706, a gaze detection unit 708, a world-facing camera array 710, and a gesture detection unit 712.

The visual display unit 702 is operable to present a displayed image to the wearer (e.g., user) of the AR subsystem 700. The visual display unit 702 may operate in any manner including projecting images onto a translucent surface between the user's eye(s) and the outer world, the translucent surface may implement mirrors, lenses, prisms, color filters, or other optical apparatus to generate an image. The visual display unit 702 may operate by projecting images directly onto the user's retinas. In general the visual display unit 702 operates to provide an augmented reality (AR) experience where the user is able to view most of the real world around her with the computer generated image (CGI) (e.g., AR content) being a relatively small portion of the user's field of view. The mixture of the virtual reality images and the real-world experience provides an immersive, mobile, and flexible experience.

Alternatively, in some form factors, the visual display unit 702 may provide an AR experience on a handheld or mobile device's display screen. For example, the visual display unit 702 may be a light-emitting diode (LED) screen, organic LED screen, liquid crystal display (LCD) screen, or the like, incorporated into a tablet computer, smartphone, or other mobile device. When a user holds the mobile device in a certain fashion, a world-facing camera array on the backside of the mobile device may operate to capture the environment, which may be displayed on the screen. Additional information (e.g., AR content) may be presented next to representations of real-world objects. The AR content may be overlaid on top of the real-world object, obscuring the real-world object in the presentation on the visual display unit 702. Alternatively, the presentation of the AR content may be on a sidebar, in a margin, in a popup window, in a separate screen, or the like.

The AR subsystem 700 includes an inertial tracking system that employs a sensitive inertial measurement unit (IMU). The IMU may include the accelerometer 704 and the gyroscope 706, and optionally includes a magnetometer. The IMU is an electronic device that measures a specific force, angular rate, and sometimes magnetic field around the AR subsystem 700. The IMU may calculate six degrees of freedom allowing the AR subsystem 700 to align AR content to the physical world or to generally determine the position or movement of the user's head.

The gaze detection unit 708 may employ an eye tracker to measure the point of gaze, allowing the AR subsystem 700 to determine where the user is looking. Gaze detection may be performed using a non-contact, optical method to determine eye motion. Infrared light may be reflected from the user's eye and sensed by an inward-facing video camera or some other optical sensor. The information is then analyzed to extract eye rotation based on the changes in the reflections from the user's retina. Another implementation may use video to track eye movement by analyzing a corneal reflection (e.g., the first Purkinje image) and the center of the pupil. Use of multiple Purkinje reflections may be used as a more sensitive eye tracking method. Other tracking methods may also be used, such as tracking retinal blood vessels, infrared tracking, or near-infrared tracking techniques. The gaze detection unit 708 may calibrate the user's eye positions before actual use.

The world-facing camera array 710 may include one or more infrared or visible light cameras, able to focus at long-range or short-range with narrow or large fields of view. The world-facing camera array 710 may include gimbals or other mechanical or electromechanical mechanisms to automatically level the cameras while the AR subsystem 700 is moving. For example, the AR subsystem 700 may include a recessed pocket in which a camera is housed on a gimbal. When the wearer looks up or down, the gimbaled camera may automatically level itself so as to maintain a relatively level field of view. In addition, cameras in the world-facing camera array 710 may include electromotors to pan the camera from left to right or tilt the camera from up to down. Pan and tilt controls may be used to maintain a relatively level field of view. Gimbals and electromotors may be used in combination to stabilize the field of view when the AR subsystem 700 is moving. In addition to, or alternatively, cameras in the world-facing camera array 710 may include image processing features to stabilize the image using specialized hardware or software. Thus, any form or image stabilization including, but not limited to optical image stabilization (OIS), sensor-shift or mechanical stabilization, or digital image stabilization may be used alone or in combination to stabilize the images captured by the world-facing camera array 710.

In operation, while the user is wearing the AR subsystem 700, the user may perform a combination movements that combine into a gesture. The world-facing camera array 710 captures the movements and the gesture detection unit 712 determines whether the movements constitute a recognized gesture. If the movements do constitute a recognized gesture, the gesture detection unit may trigger operations performed by an image processing unit 714. The image processing unit 714 may interface with the camera array 710 to obtain one or more images of the environment around the user. The image processing unit 714 may perform various operations including identifying a selection area of the image(s), performing optical character recognition on the selection area, interfacing with a language translation unit 716 in some cases, and interfacing with the visual display unit 702 to provide AR content to display.

Figure 8:
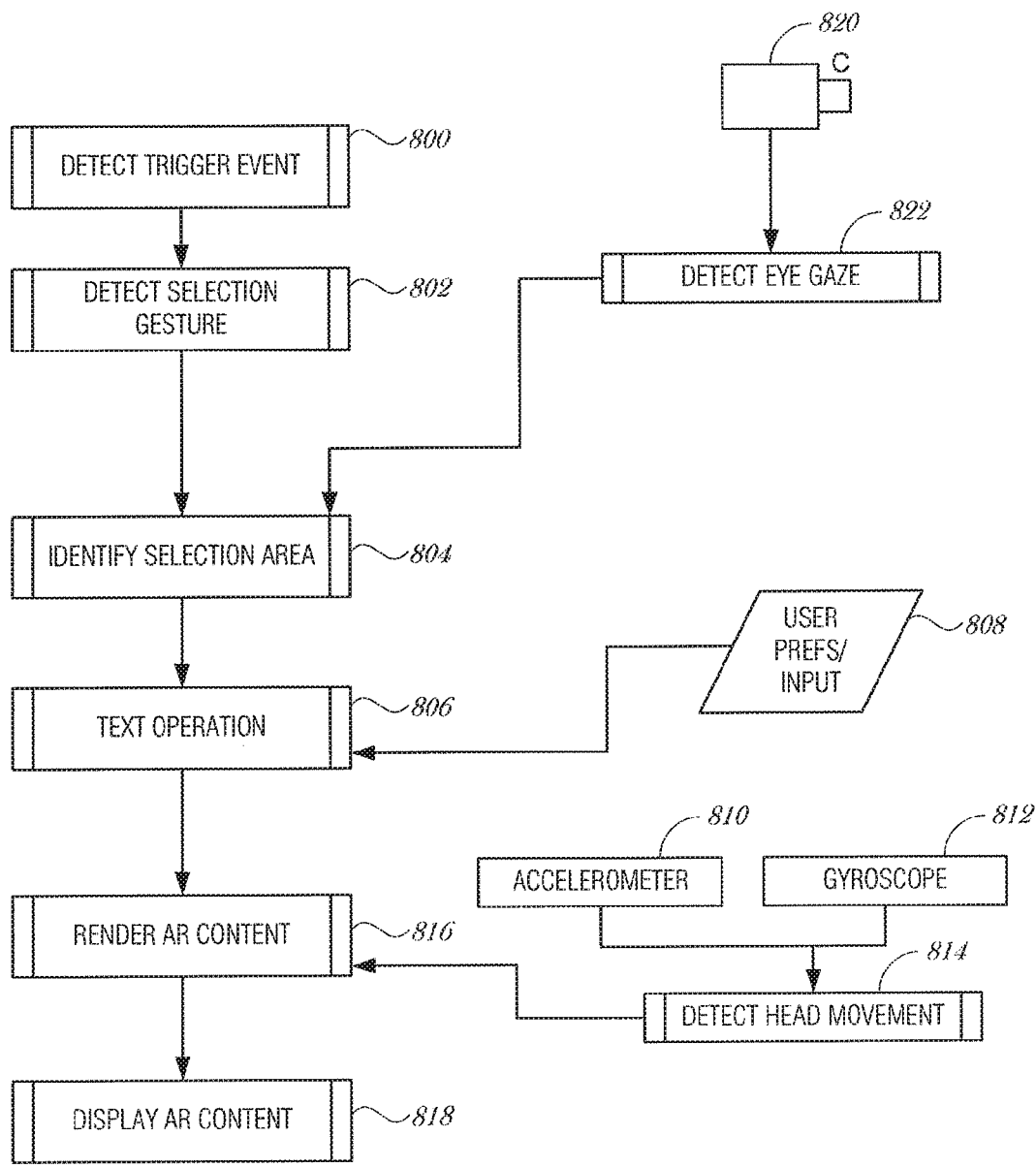
FIG. 8 is a flowchart illustrating control and data flow, according to an embodiment.

FIG. 8 is a flowchart illustrating control and data flow, according to an embodiment. A trigger event is detected (operation 800). The trigger event may be a specific gesture, a vocal command, pressing a hard button, or the like. The trigger event is used to place the AR subsystem in gesture recognition mode for text operations. Gesture recognition mode may be active for a short time (e.g., 30 seconds) or for a longer time (e.g., until deactivated).

Once in gesture recognition mode, a selection gesture is recognized (operation 802). The selection gesture may be any of a number of gestures using one or two hands, one or more fingers, etc. The selection gesture may be a point-and-swipe gesture, a looping elliptical gesture, spreading hands or fingers to define a selection area, using gestures to define a first and second point which may then be used to define two opposite corner points in a rectangular selection area, or the like. A selected area is identified (operation 804) based at least in part on the selection gesture.

Based on the selection area defined by the selection gesture, a text operation is performed (operation 806). The text operation performed may be controlled by a user input or by user preferences (item 808). For example, the user may select the operation from a popup dialog box that appears in the AR content or verbalize their selection with a voice command. Alternatively, the user may set preferences to always perform translation unless overridden.

An accelerometer 810 and a gyroscope 812 are used to detect head movement (operation 814). AR content is rendered (operation 816) and may be oriented based on the head movement detected at 814 to maintain a consistent visual cohesiveness between AR content and the real world. The AR content is presented to the user at operation 818. The presentation may be in a HMD, on a smartphone, or by other display modalities.

In some embodiments, one or more eye gaze detection cameras 820 are used to detect the user's eye gaze (operation 822). The user's eye gaze may be used to validate the object being selected by the selection gesture (operation 804).

Figure 9:
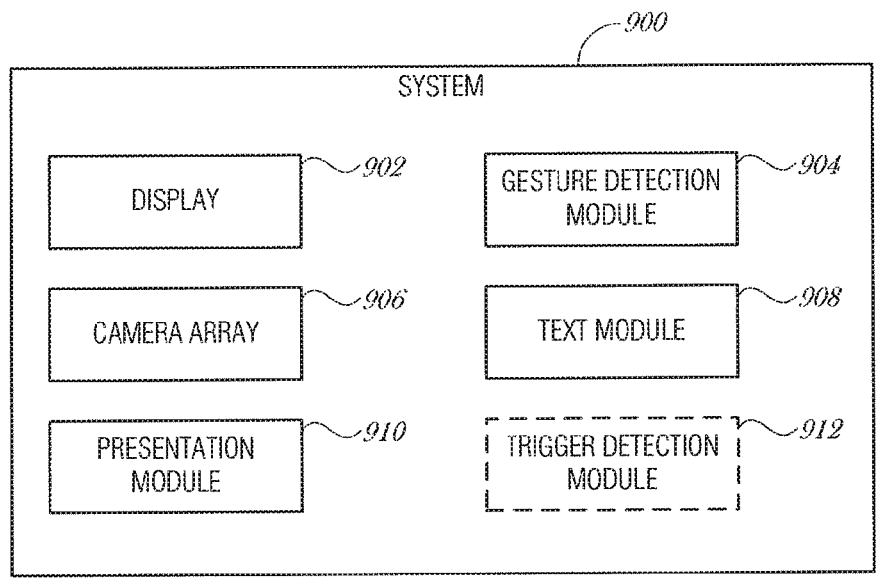
FIG. 9 is a block diagram illustrating system for implementing text functions in augmented reality, according to an embodiment.

FIG. 9 is a block diagram illustrating system 900 for implementing text functions in augmented reality, according to an embodiment. The system 900 may include a display 902, a gesture detection module 904, a camera array 906, a text module 908, a presentation module 910, and an optional trigger detection module 912.

The display 902 may be any mechanism to provide a visual presentation to a user of the system 900) as described above with respect to visual display unit 702. The display 902 may be configured to display a field of view to a user of the system. When the display 902 is used in a HMD, the display 902 may be translucent or transparent to allow the user to view the real world through the display 902, except for any portions where an image or other visual representation is presented on the display 902. When the display 902 is in a mobile device, such as a tablet or smartphone, the display 902 may be a LCD, LED, or OLED panel, for example.

The gesture detection module 904 may be configured to detect a selection gesture performed by a user of the system, the selection gesture defining a selection area in the field of view.

In an embodiment, to detect the selection gesture, the gesture detection module 904 is to access image data of an arm, finger, or hand motion of the user captured by the camera array 906 and identify the selection gesture based on the image data. The image data may be a number of successive images (e.g., video) over which the gesture is performed.

In an embodiment, to detect the selection gesture, the gesture detection module 904 is to access depth image data of an arm, finger, or hand motion of the user captured by the camera array 906 and identify the selection gesture based on the depth image data. The depth image data may be a number of successive images (e.g., video) over which the gesture is performed.

In an embodiment, to detect the selection gesture, the gesture detection module 904 is to access motion data from an auxiliary device, the motion data describing an arm, finger, or hand motion of the user and identify the selection gesture based on the motion data. In a further embodiment, the auxiliary device comprises a wearable device. The wearable device may be any type of wearable device that is able to convey motion data indicative of a finger, hand, or arm gesture on one or both arms of a user. In various embodiments, the wearable device comprises a smartwatch or a smart ring.

In an embodiment, the selection gesture comprises a point-and-swipe motion, and the selection area comprises a linear character string. A point-and-swipe motion is one where the user initially makes an affirmative pointing motion followed by a sweep of their finger, hand, or arm. An affirmative pointing motion is one where the user motions with their wrist, hand, and finger, as if shaking water off of their fingers. The affirmative pointing motion may be detected by a motion that exceeds a threshold motion based on a threshold distance moved, a threshold acceleration observed in the motion, or combinations thereof. The point-and-swipe motion may indicate a line of text, a single word, or some other linear arrangement of text to operate upon. Alternatively, the point-and-swipe motion may define a block of text, such as that shown in the example illustrated in FIGS. 4A-4B.

In an embodiment, the selection gesture comprises a point-swipe-point motion, and the selection area comprises a rectangular area including a character block. The point-swipe-point motion may include a first affirmative pointing motion, followed by a sweeping or swipe motion, and terminating with a second affirmative pointing motion. The point-swipe-point motion is illustrated as an example in FIGS. 5A-5B.

In an embodiment, the selection gesture comprises a point-and-loop motion, and the selection area comprises a character block. The point-and-loop motion may include an affirmative pointing motion followed by a sweeping motion that generally describes a circle or ellipse in space. The sweeping motion terminates near the location of the affirmative pointing motion, thus completing the loop. An example of the point-and-loop motion is illustrated in FIGS. 6A and 6B. Both the point-swipe-point and the point-and-loop gestures may be used to define a single word, a line of text, or a block of text, in various embodiments.

The camera array 906 may be configured to capture an image of the selection area. The camera array 906 may include one or more cameras able to capture visible light, infrared, or the like, and may be used as 2D or 3D cameras (e.g., depth camera). The camera array 906 may configured like camera array 204 or camera array 710, in various embodiments.

The text module 908 may be configured to perform a text operation on text identified in the image. The presentation module 910 may be configured to present an indication of the text operation to the user.

In an embodiment, to perform the text operation, the text module 908 is to identify a character string from the text identified in the image and translate the word from a first language to a second language. The character string may be a word, a sentence, or a paragraph, in various embodiments. In an embodiment, to present the indication of the text operation, the presentation module 910 is to display a translation of text identified in the image in the field of view and collocated with the text identified in the image. Text translation may use one or more dictionaries or other repositories to determine a translation or replacement phrase for the text in the image. The translation may be a direct translation or may account for accents, dialects, or local slang. The replacement text or translation used may be configurable by the user. Collocated in this disclosure means near to or overlaid upon the text identified in the image. The collocated translated text or replacement text may be produced as an image that fully obscures the real-world object, or only partially obscures it (e.g., with a translucency).

In an embodiment, to perform the text operation, the text module 908 is to identify a portion from the text identified in the image and copy the portion from the text identified in the image to a memory buffer, the memory buffer used for copy and paste operations. In such an embodiment, to present the indication of the text operation, the presentation module 910 is to display a notification in the field of view. In a further embodiment, the notification comprises an icon. As such, the user may see text and is able to capture and paste the text to another application. For example, the user may observe a recipe that is interesting, and capture and paste the text of the recipe to a data repository, such as a virtual notepad, for later access and use. As another example, the user may see a hyperlink to a business printed on the side of a business vehicle, gesture to select the hyperlink, open an Internet browser, and paste the hyperlink into an address field of the browser to navigate to the website. Other types of copy-paste operations are understood to be within the scope of this disclosure.

In an embodiment, to perform the text operation, the text module 908 is to identify a portion from the text identified in the image and copy the portion from the text identified in the image to a memory buffer, the memory buffer used for copy and paste operations. In such an embodiment, to present the indication of the text operation, the presentation module 910 is to produce an audible notification to the user. For example, when the text copy operation is successful, a high pitch tone is played to the user, and when the text copy operation is unsuccessful, a low pitch buzz is played to the user. Alternatively, a voice may be used to provide the user a "Copy Successful" phrase or a "Copy Failed" phrase, according to the result of the operation. Thus, in an embodiment, the audible notification comprises a voice notification. In another embodiment, the audible notification comprises a tonal notification.

In some embodiments, a trigger event is first detected before the selection gesture is detected. In other embodiments, the system 900 continually observes the user's motions to determine whether a selection gesture occurred. Using a trigger event may conserve computing and battery power. Thus, in an embodiment, the trigger detection module is to detect, at the system 900, a trigger action, the trigger action to initiate a selection gesture detection mode to detect the selection gesture and capture the selection area. The trigger action may be various types of actions performed by the user, such as pressing a button on the system (e.g., a hard button on the outside of the housing of the system), performing a specific gesture, using a voice command, using a tapping haptic-based trigger, sliding a physical switch, or the like. In an embodiment, to detect the trigger action, the trigger detection module 912 is to detect a trigger gesture performed by the user. Detecting the trigger gesture may be performed similarly to detecting the selection gesture.

Thus, in an embodiment, to detect the trigger gesture, the trigger detection module 912 is to access image data of an arm, finger, or hand motion of the user and identify the trigger gesture based on the image data. In another embodiment, to detect the trigger gesture, the trigger detection module 912 is to access depth image data of an arm, finger, or hand motion of the user and identify the trigger gesture based on the depth image data. In another embodiment, to detect the trigger gesture, the trigger detection module 912 is to access motion data from an auxiliary device, the motion data describing an arm, finger, or hand motion of the user and identify the trigger gesture based on the motion data.

In an embodiment, the field of view is defined without use of eye gaze tracking information. Thus, the user is able to select the word, line, or block of text without actively gazing at the text. Further, many systems that implement eye gaze tracking use an inward or user-facing camera. As such, systems that do not use eye gaze tracking for text operations, such as those described herein, may have design, functional, and economical advantages over systems that include eye gaze tracking abilities.

Figure 10:
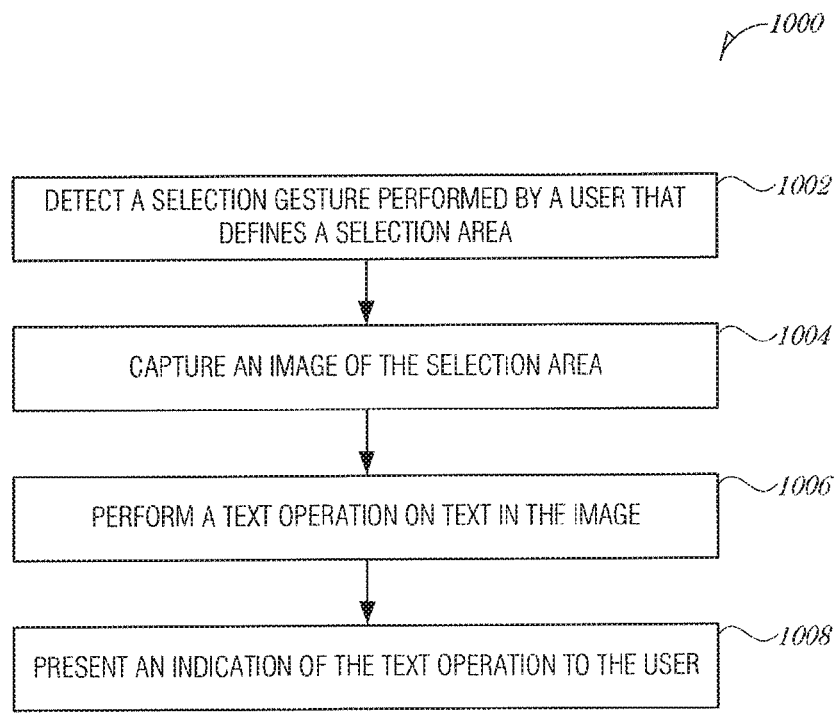
FIG. 10 is a flowchart illustrating a method of implementing text functions in augmented reality, according to an embodiment.

FIG. 10 is a flowchart illustrating a method 1000 of implementing text functions in augmented reality, according to an embodiment. At block 1002, a selection gesture performed by a user of a user device is detected at the user device, the user device displaying a field of view to a user of the user device, and the selection gesture defining a selection area in the field of view. In an embodiment, the selection gesture comprises a point-and-swipe motion, and the selection area comprises a linear character string. In another embodiment, the selection gesture comprises a point-swipe-point motion, and the selection area comprises a rectangular area including a character block. In another embodiment, the selection gesture comprises a point-and-loop motion, and the selection area comprises a character block.

In an embodiment, detecting the selection gesture comprises capturing image data of an arm, finger, or hand motion of the user and identifying the selection gesture based on the image data.

In an embodiment, detecting the selection gesture comprises capturing depth image data of an arm, finger, or hand motion of the user and identifying the selection gesture based on the depth image data.

In an embodiment, detecting the selection gesture comprises receiving motion data from an auxiliary device, the motion data describing an arm, finger, or hand motion of the user and identifying the selection gesture based on the motion data.

At block 1004, an image of the selection area is captured.

At block 1006, a text operation is performed on text identified in the image.

At block 1008, an indication of the text operation is presented via the user device, to the user.

In an embodiment, performing the text operation comprises identifying a character string from the text identified in the image and translating the word from a first language to a second language. In such an embodiment, herein presenting the indication of the text operation comprises displaying a translation of text identified in the image in the field of view and collocated with the text identified in the image. In various embodiments, the character string is a word, a sentence, or a paragraph.

In an embodiment, performing the text operation comprises identifying a portion from the text identified in the image and copying the portion from the text identified in the image to a memory buffer, the memory buffer used for copy and paste operations. In such an embodiment, presenting the indication of the text operation comprises displaying a notification in the field of view. In a further embodiment, the notification comprises an icon.

In an embodiment, performing the text operation comprises identifying a portion from the text identified in the image and copying the portion from the text identified in the image to a memory buffer, the memory buffer used for copy and paste operations. In such an embodiment, presenting the indication of the text operation comprises producing an audible notification to the user. In an embodiment, the audible notification comprises a voice notification. In another embodiment, the audible notification comprises a tonal notification. Combinations of voice and tone may be used.

In an embodiment, the method 1000 includes detecting, at the user device, a trigger action, the trigger action to initiate a selection gesture detection mode to detect the selection gesture and capture the selection area. The trigger action may be various actions and detecting the trigger action may be performed in various ways.

In an embodiment, detecting the trigger action comprises detecting a trigger gesture performed by the user. In a further embodiment, detecting the trigger gesture comprises capturing image data of an arm, finger, or hand motion of the user and identifying the trigger gesture based on the image data. In another embodiment, detecting the trigger gesture comprises capturing depth image data of an arm, finger, or hand motion of the user and identifying the trigger gesture based on the depth image data. In another embodiment, wherein detecting the trigger gesture comprises receiving motion data from an auxiliary device, the motion data describing an arm, finger, or hand motion of the user and identifying the trigger gesture based on the motion data. In an embodiment, detecting the trigger action comprises detecting a voice command performed by the user.

In an embodiment, the field of view is defined without use of eye gaze tracking information.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 11:
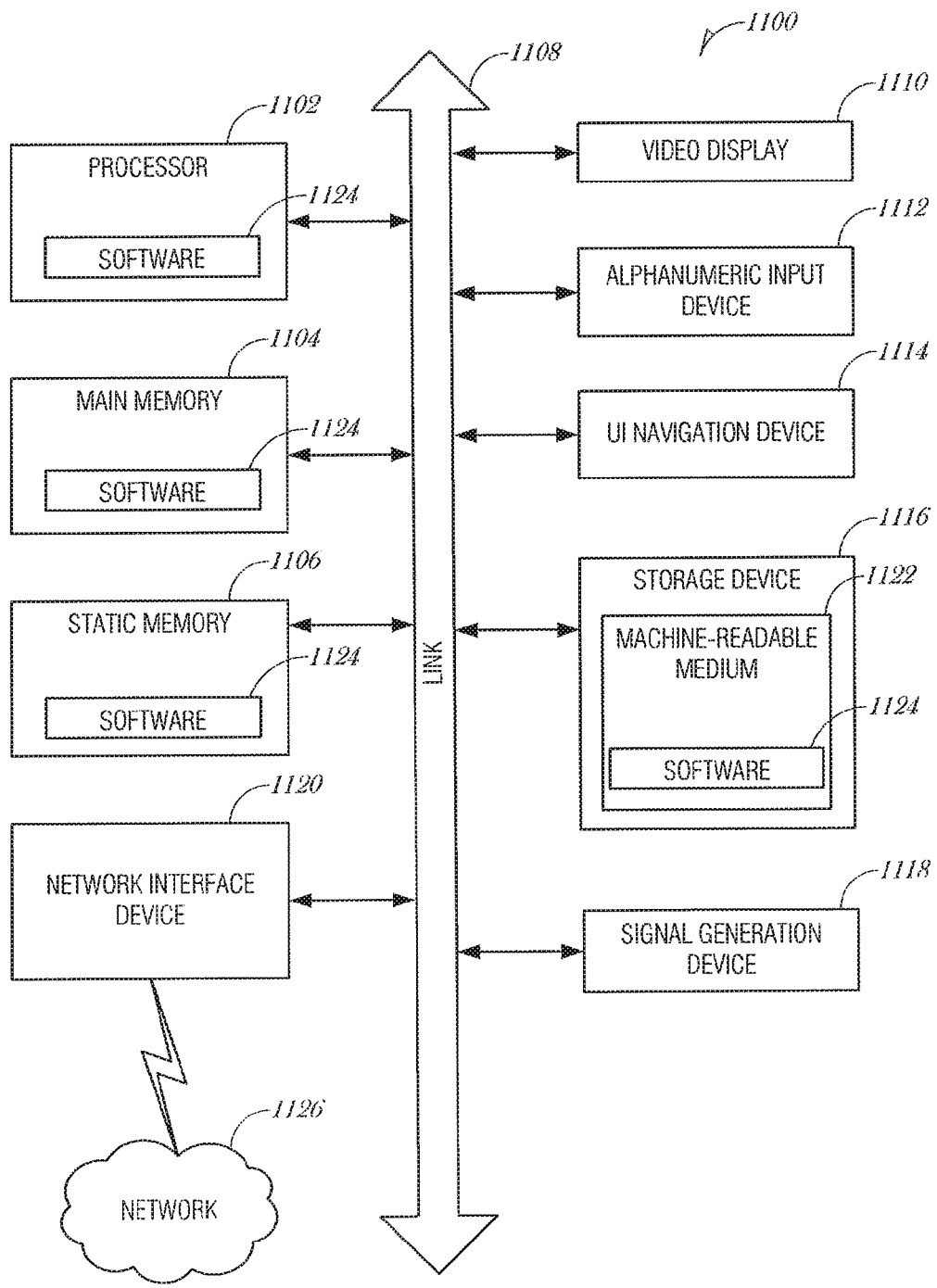
FIG. 11 is a block diagram illustrating an example machine upon which any one or more of the techniques (e.g., methodologies) discussed herein may perform, according to an example embodiment.

FIG. 11 is a block diagram illustrating a machine in the example form of a computer system 1100, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyrometer, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) for implementing text functions in augmented reality comprising: a display to display a field of view to a user of the system; a gesture detection module to detect a selection gesture performed by a user of the system, the selection gesture defining a selection area in the field of view; a camera array to capture an image of the selection area; a text module to perform a text operation on text identified in the image; and a presentation module to present an indication of the text operation to the user.

In Example 2, the subject matter of Example 1 may include, wherein to detect the selection gesture, the gesture detection module is to: access image data of an arm, finger, or hand motion of the user captured by the camera array; and identify the selection gesture based on the image data.

In Example 3, the subject matter of any one of Examples 1 to 2 may include, wherein to detect the selection gesture, the gesture detection module is to: access depth image data of an arm, finger, or hand motion of the user captured by the camera array; and identify the selection gesture based on the depth image data.

In Example 4, the subject matter of any one of Examples 1 to 3 may include, wherein to detect the selection gesture, the gesture detection module is to: access motion data from an auxiliary device, the motion data describing an arm, finger, or hand motion of the user; and identify the selection gesture based on the motion data.

In Example 5, the subject matter of any one of Examples 1 to 4 may include, wherein the auxiliary device comprises a wearable device.

In Example 6, the subject matter of any one of Examples 1 to 5 may include, wherein the wearable device comprises a smartwatch.

In Example 7, the subject matter of any one of Examples 1 to 6 may include, wherein the wearable device comprises a smart ring.

In Example 8, the subject matter of any one of Examples 1 to 7 may include, wherein the selection gesture comprises a point-and-swipe motion, and the selection area comprises a linear character string.

In Example 9, the subject matter of any one of Examples 1 to 8 may include, wherein the selection gesture comprises a point-swipe-point motion, and the selection area comprises a rectangular area a character block.

In Example 10, the subject matter of any one of Examples 1 to 9 may include, wherein the selection gesture comprises a point-and-loop motion, and the selection area comprises a character block.

In Example 11, the subject matter of any one of Examples 1 to 10 may include, wherein to perform the text operation, the text module is to: identify a character string from the text identified in the image; and translate the word from a first language to a second language, and wherein to present the indication of the text operation, the presentation module is to: display a translation of text identified in the image in the field of view and collocated with the text identified in the image.

In Example 12, the subject matter of any one of Examples 1 to 11 may include, wherein the character string is a word.

In Example 13, the subject matter of any one of Examples 1 to 12 may include, wherein the character string is a sentence.

In Example 14, the subject matter of any one of Examples 1 to 13 may include, wherein the character string is a paragraph.

In Example 15, the subject matter of any one of Examples 1 to 14 may include, wherein to perform the text operation, the text module is to: identify a portion from the text identified in the image; and copy the portion from the text identified in the image to a memory buffer, the memory buffer used for copy and paste operations, and wherein to present the indication of the text operation, the presentation module is to: display a notification in the field of view.

In Example 16, the subject matter of any one of Examples 1 to 15 may include, wherein the notification comprises an icon.

In Example 17, the subject matter of any one of Examples 1 to 16 may include, wherein to perform the text operation, the text module is to: identify a portion from the text identified in the image; and copy the portion from the text identified in the image to a memory buffer, the memory buffer used for copy and paste operations, and wherein to present the indication of the text operation, the presentation module is to: produce an audible notification to the user.

In Example 18, the subject matter of any one of Examples 1 to 17 may include, wherein the audible notification comprises a voice notification.

In Example 19, the subject matter of any one of Examples 1 to 18 may include, wherein the audible notification comprises a tonal notification.

In Example 20, the subject matter of any one of Examples 1 to 19 may include, a trigger detection module to detect, at the system, a trigger action, the trigger action to initiate a selection gesture detection mode to detect the selection gesture and capture the selection area.

In Example 21, the subject matter of any one of Examples 1 to 20 may include, wherein to detect the trigger action, the trigger detection module is to detect a trigger gesture performed by the user.

In Example 22, the subject matter of any one of Examples 1 to 21 may include, wherein to detect the trigger gesture, the trigger detection module is to: access image data of an arm, finger, or hand motion of the user; and identify the trigger gesture based on the image data.

In Example 23, the subject matter of any one of Examples 1 to 22 may include, wherein to detect the trigger gesture, the trigger detection module is to: access depth image data of an arm, finger, or hand motion of the user; and identify the trigger gesture based on the depth image data.

In Example 24, the subject matter of any one of Examples 1 to 23 may include, wherein to detect the trigger gesture, the trigger detection module is to: access motion data from an auxiliary device, the motion data describing an arm, finger, or hand motion of the user; and identify the trigger gesture based on the motion data.

In Example 25, the subject matter of any one of Examples 1 to 24 may include, wherein the auxiliary device comprises a wearable device.

In Example 26, the subject matter of any one of Examples 1 to 25 may include, wherein the wearable device comprises a smartwatch.

In Example 27, the subject matter of any one of Examples 1 to 26 may include, wherein the wearable device comprises a smart ring.

In Example 28, the subject matter of any one of Examples 1 to 27 may include, wherein to detect the trigger action, the trigger detection module is to detect a voice command performed by the user.

In Example 29, the subject matter of any one of Examples 1 to 28 may include, wherein the field of view is defined without use of eye gaze tracking information.

Example 30 includes subject matter (such as a method, means for performing acts, machine readable medium including instructions that when performed by a machine cause the machine to performs acts, or an apparatus to perform) for implementing text functions in augmented reality comprising: detecting, at a user device, a selection gesture performed by a user of the user device, the user device displaying a field of view to a user of the user device, and the selection gesture defining a selection area in the field of view; capturing an image of the selection area; performing a text operation on text identified in the image; and presenting, via the user device, an indication of the text operation to the user.

In Example 31, the subject matter of Example 30 may include, wherein detecting the selection gesture comprises: capturing image data of an arm, finger, or hand motion of the user; and identifying the selection gesture based on the image data.

In Example 32, the subject matter of any one of Examples 30 to 31 may include, wherein detecting the selection gesture comprises: capturing depth image data of an arm, finger, or hand motion of the user; and identifying the selection gesture based on the depth image data.

In Example 33, the subject matter of any one of Examples 30 to 32 may include, wherein detecting the selection gesture comprises: receiving motion data from an auxiliary device, the motion data describing an arm, finger, or hand motion of the user; and identifying the selection gesture based on the motion data.

In Example 34, the subject matter of any one of Examples 30 to 33 may include, wherein the selection gesture comprises a point-and-swipe motion, and the selection area comprises a linear character string.

In Example 35, the subject matter of any one of Examples 30 to 34 may include, wherein the selection gesture comprises a point-swipe-point motion, and the selection area comprises a rectangular area a character block.

In Example 36, the subject matter of any one of Examples 30 to 35 may include, wherein the selection gesture comprises a point-and-loop motion, and the selection area comprises a character block.

In Example 37, the subject matter of any one of Examples 30 to 36 may include, wherein performing the text operation comprises: identifying a character string from the text identified in the image; and translating the word from a first language to a second language, and wherein presenting the indication of the text operation comprises: displaying a translation of text identified in the image in the field of view and collocated with the text identified in the image.

In Example 38, the subject matter of any one of Examples 30 to 37 may include, wherein the character string is a word.

In Example 39, the subject matter of any one of Examples 30 to 38 may include, wherein the character string is a sentence.

In Example 40, the subject matter of any one of Examples 30 to 39 may include, wherein the character string is a paragraph.

In Example 41, the subject matter of any one of Examples 30 to 40 may include, wherein performing the text operation comprises: identifying a portion from the text identified in the image; and copying the portion from the text identified in the image to a memory buffer, the memory buffer used for copy and paste operations; and wherein presenting the indication of the text operation comprises: displaying a notification in the field of view.

In Example 42, the subject matter of any one of Examples 30 to 41 may include, wherein the notification comprises an icon.

In Example 43, the subject matter of any one of Examples 30 to 42 may include, wherein performing the text operation comprises: identifying a portion from the text identified in the image; and copying the portion from the text identified in the image to a memory buffer, the memory buffer used for copy and paste operations; and wherein presenting the indication of the text operation comprises: producing an audible notification to the user.

In Example 44, the subject matter of any one of Examples 30 to 43 may include, wherein the audible notification comprises a voice notification.

In Example 45, the subject matter of any one of Examples 30 to 44 may include, wherein the audible notification comprises a tonal notification.

In Example 46, the subject matter of any one of Examples 30 to 45 may include, detecting, at the user device, a trigger action, the trigger action to initiate a selection gesture detection mode to detect the selection gesture and capture the selection area.

In Example 47, the subject matter of any one of Examples 30 to 46 may include, wherein detecting the trigger action comprises detecting a trigger gesture performed by the user.

In Example 48, the subject matter of any one of Examples 30 to 47 may include, wherein detecting the trigger gesture comprises: capturing image data of an arm, finger, or hand motion of the user; and identifying the trigger gesture based on the image data.

In Example 49, the subject matter of any one of Examples 30 to 48 may include, wherein detecting the trigger gesture comprises: capturing depth image data of an arm, finger, or hand motion of the user; and identifying the trigger gesture based on the depth image data.

In Example 50, the subject matter of any one of Examples 30 to 49 may include, wherein detecting the trigger gesture comprises: receiving motion data from an auxiliary device, the motion data describing an arm, finger, or hand motion of the user; and identifying the trigger gesture based on the motion data.

In Example 51, the subject matter of any one of Examples 30 to 50 may include, wherein the auxiliary device comprises a wearable device.

In Example 52, the subject matter of any one of Examples 30 to 51 may include, wherein the wearable device comprises a smartwatch.

In Example 53, the subject matter of any one of Examples 30 to 52 may include, wherein the wearable device comprises a smart ring.

In Example 54, the subject matter of any one of Examples 30 to 53 may include, wherein detecting the trigger action comprises detecting a voice command performed by the user.

In Example 55, the subject matter of any one of Examples 30 to 54 may include, wherein the field of view is defined without use of eye gaze tracking information.

Example 56 includes at least one machine-readable medium including instructions, which when executed by a machine, cause the machine to perform operations of any of the Examples 30-55.

Example 57 includes an apparatus comprising means for performing any of the Examples 30-55.

Example 58 includes subject matter (such as a device, apparatus, or machine) for implementing text functions in augmented reality comprising: means for detecting, at a user device, a selection gesture performed by a user of the user device, the user device displaying a field of view to a user of the user device, and the selection gesture defining a selection area in the field of view; means for capturing an image of the selection area; means for performing a text operation on text identified in the image; and means for presenting, via the user device, an indication of the text operation to the user.

In Example 59, the subject matter of Example 58 may include, wherein the means for detecting the selection gesture comprise: means for capturing image data of an arm, finger, or hand motion of the user; and means for identifying the selection gesture based on the image data.

In Example 60, the subject matter of any one of Examples 58 to 59 may include, wherein the means for detecting the selection gesture comprise: means for capturing depth image data of an arm, finger, or hand motion of the user; and means for identifying the selection gesture based on the depth image data.

In Example 61, the subject matter of any one of Examples 58 to 60 may include, wherein the means for detecting the selection gesture comprise means for: means for receiving motion data from an auxiliary device, the motion data describing an arm, finger, or hand motion of the user; and means for identifying the selection gesture based on the motion data.

In Example 62, the subject matter of any one of Examples 58 to 61 may include, wherein the selection gesture comprises a point-and-swipe motion, and the selection area comprises a linear character string.

In Example 63, the subject matter of any one of Examples 58 to 62 may include, wherein the selection gesture comprises a point-swipe-point motion, and the selection area comprises a rectangular area a character block.

In Example 64, the subject matter of any one of Examples 58 to 63 may include, wherein the selection gesture comprises a point-and-loop motion, and the selection area comprises a character block.

In Example 65, the subject matter of any one of Examples 58 to 64 may include, wherein the means for performing the text operation comprise: means for identifying a character string from the text identified in the image; and means for translating the word from a first language to a second language, and wherein presenting the indication of the text operation comprises: means for displaying a translation of text identified in the image in the field of view and collocated with the text identified in the image.

In Example 66, the subject matter of any one of Examples 58 to 65 may include, wherein the character string is a word.

In Example 67, the subject matter of any one of Examples 58 to 66 may include, wherein the character string is a sentence.

In Example 68, the subject matter of any one of Examples 58 to 67 may include, wherein the character string is a paragraph.

In Example 69, the subject matter of any one of Examples 58 to 68 may include, wherein the means for performing the text operation comprise: means for identifying a portion from the text identified in the image; and means for copying the portion from the text identified in the image to a memory buffer, the memory buffer used for copy and paste operations; and wherein presenting the indication of the text operation comprises: displaying a notification in the field of view.

In Example 70, the subject matter of any one of Examples 58 to 69 may include, wherein the notification comprises an icon.

In Example 71, the subject matter of any one of Examples 58 to 70 may include, wherein performing the text operation comprises: identifying a portion from the text identified in the image; and copying the portion from the text identified in the image to a memory buffer, the memory buffer used for copy and paste operations; and wherein the means for presenting the indication of the text operation comprises: means for producing an audible notification to the user.

In Example 72, the subject matter of any one of Examples 58 to 71 may include, wherein the audible notification comprises a voice notification.

In Example 73, the subject matter of any one of Examples 58 to 72 may include, wherein the audible notification comprises a tonal notification.

In Example 74, the subject matter of any one of Examples 58 to 73 may include, means for detecting, at the user device, a trigger action, the trigger action to initiate a selection gesture detection mode to detect the selection gesture and capture the selection area.

In Example 75, the subject matter of any one of Examples 58 to 74 may include, wherein the means for detecting the trigger action comprise means for detecting a trigger gesture performed by the user.

In Example 76, the subject matter of any one of Examples 58 to 75 may include, wherein the means for detecting the trigger gesture comprise: means for capturing image data of an arm, finger, or hand motion of the user; and means for identifying the trigger gesture based on the image data.

In Example 77, the subject matter of any one of Examples 58 to 76 may include, wherein the means for detecting the trigger gesture comprise: means for capturing depth image data of an arm, finger, or hand motion of the user; and means for identifying the trigger gesture based on the depth image data.

In Example 78, the subject matter of any one of Examples 58 to 77 may include, wherein the means for detecting the trigger gesture comprise: means for receiving motion data from an auxiliary device, the motion data describing an arm, finger, or hand motion of the user; and means for identifying the trigger gesture based on the motion data.

In Example 79, the subject matter of any one of Examples 58 to 78 may include, wherein the auxiliary device comprises a wearable device.

In Example 80, the subject matter of any one of Examples 58 to 79 may include, wherein the wearable device comprises a smartwatch.

In Example 81, the subject matter of any one of Examples 58 to 80 may include, wherein the wearable device comprises a smart ring.

In Example 82, the subject matter of any one of Examples 58 to 81 may include, wherein the means for detecting the trigger action comprise means for detecting a voice command performed by the user.

In Example 83, the subject matter of any one of Examples 58 to 82 may include, wherein the field of view is defined without use of eye gaze tracking information.

Example 84 includes subject matter (such as a device, apparatus, or machine) for implementing text functions in augmented reality comprising: display a field of view to a user of the system; detect a selection gesture performed by a user of the system, the selection gesture defining a selection area in the field of view; capture an image of the selection area; perform a text operation on text identified in the image; and present an indication of the text operation to the user.

In Example 85, the subject matter of Example 84 may include, wherein the instructions to detect the selection gesture comprise instructions to: access image data of an arm, finger, or hand motion of the user captured by the camera array; and identify the selection gesture based on the image data.

In Example 86, the subject matter of any one of Examples 84 to 85 may include, wherein the instructions to detect the selection gesture comprise instructions to: access depth image data of an arm, finger, or hand motion of the user captured by the camera array; and identify the selection gesture based on the depth image data.

In Example 87, the subject matter of any one of Examples 84 to 86 may include, wherein the instructions to detect the selection gesture comprise instructions to: access motion data from an auxiliary device, the motion data describing an arm, finger, or hand motion of the user; and identify the selection gesture based on the motion data.

In Example 88, the subject matter of any one of Examples 84 to 87 may include, wherein the auxiliary device comprises a wearable device.

In Example 89, the subject matter of any one of Examples 84 to 88 may include, wherein the wearable device comprises a smartwatch.

In Example 90, the subject matter of any one of Examples 84 to 89 may include, wherein the wearable device comprises a smart ring.

In Example 91, the subject matter of any one of Examples 84 to 90 may include, wherein the selection gesture comprises a point-and-swipe motion, and the selection area comprises a linear character string.

In Example 92, the subject matter of any one of Examples 84 to 91 may include, wherein the selection gesture comprises a point-swipe-point motion, and the selection area comprises a rectangular area a character block.

In Example 93, the subject matter of any one of Examples 84 to 92 may include, wherein the selection gesture comprises a point-and-loop motion, and the selection area comprises a character block.

In Example 94, the subject matter of any one of Examples 84 to 93 may include, wherein the instructions to perform the text operation comprise instructions to: identify a character string from the text identified in the image; and translate the word from a first language to a second language, and wherein to present the indication of the text operation, the presentation module is to: display a translation of text identified in the image in the field of view and collocated with the text identified in the image.

In Example 95, the subject matter of any one of Examples 84 to 94 may include, wherein the character string is a word.

In Example 96, the subject matter of any one of Examples 84 to 95 may include, wherein the character string is a sentence.

In Example 97, the subject matter of any one of Examples 84 to 96 may include, wherein the character string is a paragraph.

In Example 98, the subject matter of any one of Examples 84 to 97 may include, wherein the instructions to perform the text operation comprise instructions to: identify a portion from the text identified in the image; and copy the portion from the text identified in the image to a memory buffer, the memory buffer used for copy and paste operations, and wherein the instructions to present the indication of the text operation comprise instructions to: display a notification in the field of view.

In Example 99, the subject matter of any one of Examples 84 to 98 may include, wherein the notification comprises an icon.

In Example 100, the subject matter of any one of Examples 84 to 99 may include, wherein the instructions to perform the text operation comprise instructions to: identify a portion from the text identified in the image; and copy the portion from the text identified in the image to a memory buffer, the memory buffer used for copy and paste operations, and wherein the instructions to present the indication of the text operation comprise instructions to: produce an audible notification to the user.

In Example 101, the subject matter of any one of Examples 84 to 100 may include, wherein the audible notification comprises a voice notification.

In Example 102, the subject matter of any one of Examples 84 to 101 may include, wherein the audible notification comprises a tonal notification.

In Example 103, the subject matter of any one of Examples 84 to 102 may include, instructions to detect, at the system, a trigger action, the trigger action to initiate a selection gesture detection mode to detect the selection gesture and capture the selection area.

In Example 104, the subject matter of any one of Examples 84 to 103 may include, wherein the instructions to detect the trigger action comprise instructions to detect a trigger gesture performed by the user.

In Example 105, the subject matter of any one of Examples 84 to 104 may include, wherein the instructions to detect the trigger gesture comprise instructions to: access image data of an arm, finger, or hand motion of the user; and identify the trigger gesture based on the image data.

In Example 106, the subject matter of any one of Examples 84 to 105 may include, wherein the instructions to detect the trigger gesture comprise instructions to: access depth image data of an arm, finger, or hand motion of the user; and identify the trigger gesture based on the depth image data.

In Example 107, the subject matter of any one of Examples 84 to 106 may include, wherein the instructions to detect the trigger gesture comprise instructions to: access motion data from an auxiliary device, the motion data describing an arm, finger, or hand motion of the user; and identify the trigger gesture based on the motion data.

In Example 108, the subject matter of any one of Examples 84 to 107 may include, wherein the auxiliary device comprises a wearable device.

In Example 109, the subject matter of any one of Examples 84 to 108 may include, wherein the wearable device comprises a smartwatch.

In Example 110, the subject matter of any one of Examples 84 to 109 may include, wherein the wearable device comprises a smart ring.

In Example 111, the subject matter of any one of Examples 84 to 110 may include, wherein the instructions to detect the trigger action comprise instructions to detect a voice command performed by the user.

In Example 112, the subject matter of any one of Examples 84 to 111 may include, wherein the field of view is defined without use of eye gaze tracking information.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A." and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third."

etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for implementing text functions in augmented reality, the system comprising:
   a display to display a field of view to a user of the system;
   a gesture detection module to detect a selection gesture performed by a user of the system, the selection gesture defining a selection area in the field of view;
   a camera to capture an image of the selection area;
   a text module to perform a text operation on text identified in the image by:
      identifying a portion from the text identified in the image; and
      performing a copy and paste operation using the portion from the text identified in the image; and
   a presentation module to present an indication of the text operation to the user including a notification to the user.

2. The system of claim 1, wherein to detect the selection gesture, the gesture detection module is to:
   access depth image data of an arm, finger, or hand motion of the user captured by the camera; and
   identify the selection gesture based on the depth image data.

3. The system of claim 1, wherein to detect the selection gesture, the gesture detection module is to:
   access motion data from an auxiliary device, die motion data describing an arm, finger, or hand motion of the user; and
   identify the selection gesture based on the motion data.

4. The system of claim 3, wherein the auxiliary device comprises a wearable device.

5. The system of claim 1, wherein the selection gesture comprises a point-and-swipe motion, and the selection area comprises a linear character string.

6. The system of claim 1, wherein the selection gesture comprises a point-swipe-point motion, and the selection area comprises a rectangular area including a character block.

7. The system of claim 1, wherein the selection gesture comprises a point-and-loop motion, and the selection area comprises a character block.

8. A method of implementing text functions in augmented reality, the method comprising:
   detecting, at a user device, a selection gesture performed by a user of the user device, the user device displaying a field of view to a user of the user device, and the selection gesture defining a selection area in the field of view;
   capturing an image of the selection area;
   performing a text operation on text identified in the image; and
   presenting, via the user device, an indication of the text operation to the user;
   wherein performing the text operation comprises:
      identifying a portion from the text identified in the image; and
      performing a copy operation using the portion from the text identified in the image, the copy operation a part of a copy and paste operation; and
   wherein presenting the indication of the text operation comprises:
      presenting a notification to the user.

9. The method of claim 8, wherein detecting the selection gesture comprises:
   capturing depth image data of an arm, finger, or hand motion of the user; and
   identifying the selection gesture based on the depth image data.

10. The method of claim 8, wherein detecting the selection gesture comprises:
    receiving motion data from an auxiliary device, the motion data describing an arm, finger, or hand motion of the user; and
    identifying the selection gesture based on the motion data.

11. The method of claim 8, wherein the selection gesture comprises a point-and-swipe motion, and the selection area comprises a linear character string.

12. The method of claim 8, wherein the selection gesture comprises a point-swipe-point motion, and the selection area comprises a rectangular area including a character block.

13. The method of claim 8, wherein the selection gesture comprises a point-and-loop motion, and the selection area comprises a character block.

14. The method of claim 8, wherein performing the text operation comprises:
    identifying a character string from the text identified in the image; and
    translating the word from a first language to a second language, and wherein presenting the indication of the text operation comprises:
       displaying a translation of text identified in the image in the field of view and collocated with the text identified in the image.

15. The method of claim 8, wherein the notification comprises an audible notification.

16. The method of claim 15, wherein the audible notification comprises a voice notification.

17. At least one non-transitory machine-readable medium including instructions for implementing text functions in augmented reality, which when executed by a machine, cause the machine to:
    detect, at a user device, a selection gesture performed by a user of the user device, the user device displaying a field of view to a user of the user device, and the selection gesture defining a selection area in the field of view;
    capture an image of the selection area;
    perform a text operation on text identified in the image by:
       identifying a portion from the text identified in the image; and performing a copy operation using the portion from the text identified in the image, the copy operation a part of a copy and paste operation; and present, via the user device, an indication of the text operation to the user including presenting a notification to the user.

18. The at least one machine-readable medium of claim 17, wherein the instructions to detect the selection gesture comprise instructions to:

receive motion data from an auxiliary device, the motion data describing an arm, finger, or hand motion of the user; and identify the selection gesture based on the motion data.

19. The at least one machine-readable medium of claim 17, further comprising instructions to detect, at the user device, a trigger action, the trigger action to initiate a selection gesture detection mode to detect the selection gesture and capture the selection area.

20. The at least one machine-readable medium of claim 17, wherein the field of view is defined without use of eye gaze tracking information.

\* \* \* \* \*

UNITED STATES PATENT AND TRADEMARK OFFICE
CERTIFICATE OF CORRECTION

PATENT NO. : 10,082,940 B2  
APPLICATION NO. : 15/641015  
DATED : September 25, 2018  
INVENTOR(S) : Ivers et al.

Page 1 of 1

It is certified that error appears in the above-identified patent and that said Letters Patent is hereby corrected as shown below:

In the Claims

In Column 21, Line 49, in Claim 3, delete "die" and insert --the-- therefor

Signed and Sealed this
Eighteenth Day of June, 2019

Andrei Iancu
*Director of the United States Patent and Trademark Office*